INVENTOR.
HUGO J. WILMS, JR.
JOHN B. DREW
BY

Arthur L. Bowers
AGENT

United States Patent Office 3,156,846

Patented Nov. 10, 1964

3,156,846

HIGH POWER THYRATRON INVERTER WITH A LOW VALUE RESISTOR BY-PASS

Hugo J. Wilms, Jr., Waterford, Conn., and John B. Drew, Westerly, R.I., assignors to the United States of America as represented by the Secretary of the Navy Filed June 30, 1960, Ser. No. 40,115
2 Claims. (Cl. 315—166)
(Granted under Title 35, U.S. Code (1952), sec. 266)

Figures 1, 2, 3:
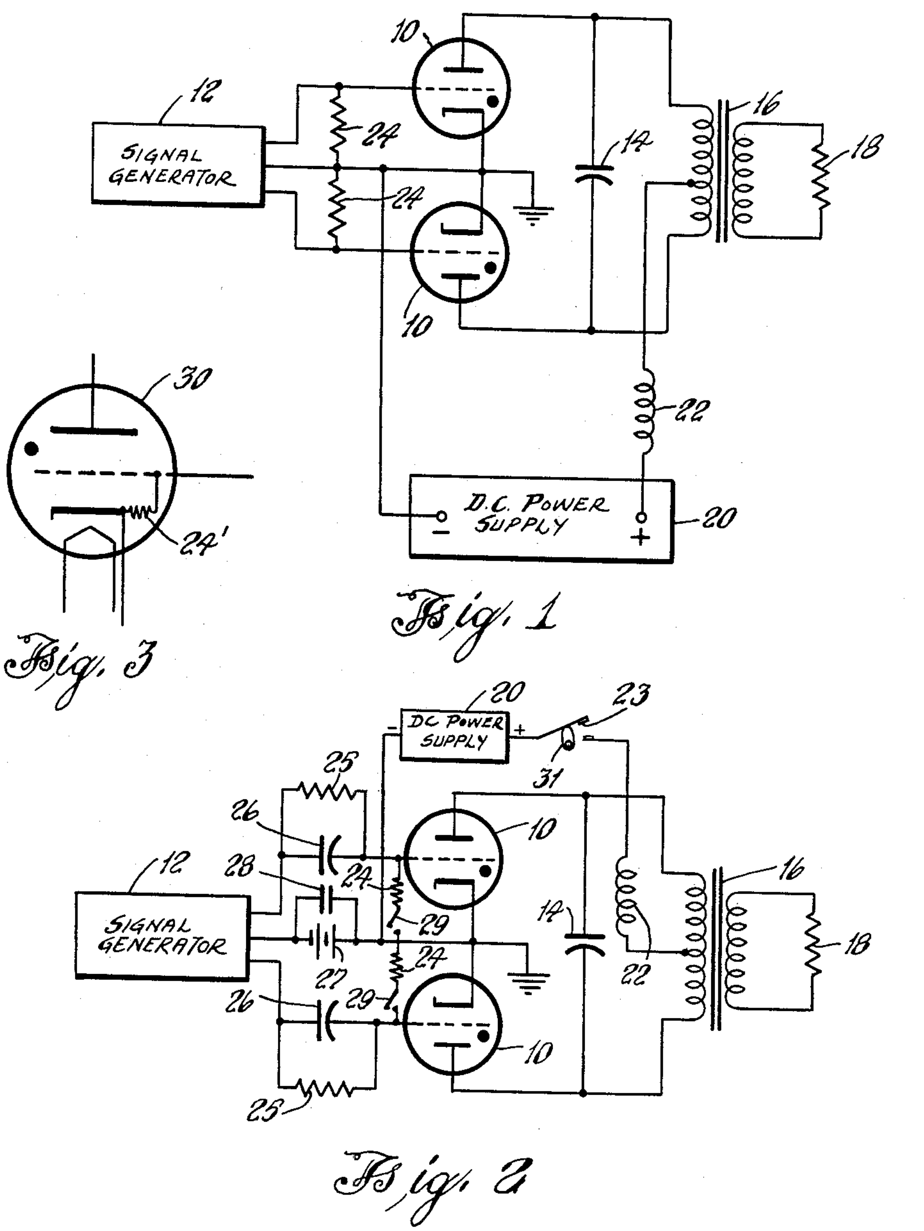

The invention described herein may be manufactured and used by or for the Government of the United States of America for governmental purposes without the payment of any royalties thereon or therefor.

This invention relates to improvements in thyratron inverters. Thyratron inverters of various designs have been known; all have the characteristics of being flexible in operation, compact and efficient. Their high efficiency is based on the low voltage drop across a thyratron when passing current. Previously, thyratron inverters, even those with components having high power ratings could not be made to operate at powers above about five kilowatts nor could they be made to operate above about two kilocycles. The maximum attainable product of power and frequency was substantially lower than the product of five kilowatts and two kilocycles. For power output near five kilowatts the attainable frequency has been substantially lower than two kilocycles and vice versa. When failure occurred the thyratrons ceased cyclical operation and passed current continuously, that is, for a very brief interval until the inverter was open circuited by burnout of a thryatron or other component. Whenever operational limits were approached, the inverter became unstable and thus ceased to be dependable; the thyratrons could cease cyclical operation at any time. At higher powers and frequencies, beyond operational limits, the thyratrons would start to conduct continuously even before one cycle of operation was completed. In other words, higher frequency and power could not be obtained even in very short pulses.

The fields of sonar, sonic and ultrasonic cleaning and welding, vibration testing, and induction heating require reliable, economical, and operationally flexible sources of alternating electrical energy of substantially sinusoidal waveform at powers above five kilowatts and as high as hundreds of kilowatts, and at frequencies, with respect to the fundamental, above two kilocycles and even substantially above the audio band.

Though vacuum tube amplifier devices and motor generator sets have been used as inverters they have many disadvantages. Within the operational limits of thyratron inverters available heretofore, vacuum tube amplifiers are considerably less efficient, require many more components, are heavier, more expensive and occupy a great deal more space than thyratron inverters. Motor generator sets also are considerably less efficient, bulky, and are not sufficiently flexible for pulsed and variable frequency operation. Though these other inverters have been used beyond the operational limitations of thyratron inverters they have not met current needs satisfactorily.

An object of this invention is to provide both a method for improving and an improved thyratron inverter for operation at higher power and/or at higher frequency than attainable heretofore with thyratron inverters.

A further object is to provide thyratron inverters wherein the possibility of instability leading to continuous rather than cyclical passage of thyratron current is greatly reduced enabling thyratron inverters to provide dependable alternating current power much higher than attainable heretofore, and pulsed alternating current as high as hundreds of kilowatts, and/or at frequencies well above ten kilocycles.

A further object is to provide a more stable thyratron for use in a thyratron inverter.

Another object is to provide a thyratron inverter which is free of the objections and disadvantage hereinabove identified.

Other objects and many of the attendant advantages of this invention will be readily appreciated as the same becomes better understood by reference to the following detailed description when considered in connection with the accompanying drawings wherein:

In its broader aspects this invention concerns thyratron inverters, in general, having therein any thyratron type, where power and frequency of the inverter is limited by the thyratron misfiring at elevated power and/or frequency leading to continuous direct current flow through the thyratrons instead of cyclically interrupted current flow that obtains at lower power and/or frequency. Whether the inverter is driven by an external signal source or is regenerative, whether the inverter is the parallel type, series type, or other, is not material, provided that the inverter's operation is limited in the manner described above. It is postulated that where a thyratron inverter is operable satisfactorily at lower power and frequency and becomes inoperative at elevated power and/or frequency due to the commencement of continuous direct current through the thyratrons, that this is caused by the cumulative effect of elevated temperature of the thyratron, voltages induced in the thyratron's signal input circuit by stray fields created incident to operation of the inverter and by switching of thyratron currents, and that at elevated power or frequency, the stray fields cause the voltages to be high enough to produce thyratron misfiring. Attempts at shielding and separation have been of no avail in preventing misfiring at elevated power and frequency. This invention concerns the addition of a low impedance on the order of one to several ohms connected in shunt across the thyratron's control element and cathode, for attenuating the voltages tending to produce misfiring.

In FIG. 1 there is shown a circuit diagram of a parallel, externally excited inverter having two gaseous type thyratrons 10. The type of thyratron selected depends upon inverter operating conditions including frequency and average and peak power to be drawn therefrom. For example, mercury thyratrons are satisfactory for high power. However, regenerative free running thyratron inverters having mercury thyratrons have poor temperature stability and therefore are not satisfactory for applications where close frequency tolerances are necessary. By comparison, hydrogen thyratrons have good temperature stability because they are designed so that their gas pressure is somewhat independent of temperature but they have lower power capacity than mercury thyratrons. A free running inverter with hydrogen thyratrons has good frequency stability. A signal generator 12, which may comprise an oscillator and a push-pull amplifier, not shown, but having a low impedance output, is connected to the signal input terminals of the thyratrons, that is, between cathode and control grid or gate element of each thyratron. Preferably the signal generator includes several output terminals, not shown, for providing several values of output impedance for proper impedance matching as is conventional on many commercial signal generators. The lowest impedance should be at least as low as five ohms. A commutating capacitor 14 is connected anode to anode of the thyratrons. A pulse power transformer 16 has its primary connected anode to anode of the thyratrons and its secondary connected to a load shown symbolically by resistor 18. A direct current power supply 20, in series with an inductance 22, is connected between the center tap of the primary of output transformer 16 and the thyratrons' cathodes. The inductance 22 stabilizes the current into the load and contributes to producing approximately sinusoidal output. Shunting impedances 24 are connected between the control grid and cathode of each thyratron 10, respectively, and disposed closely adjacent to the thyratrons. Each such shunting impedance is illustrated by way of example as a resistance and has a value suitable to attenuate the stray voltages at the tubes and thereby prevent misfiring of the thyratrons. Usually, each such resistance will have an ohmic value between about 1 ohm and about 20 ohms. The value of this impedance should be much lower than that of the input impedance between the control element and the cathode of each thyratron with reference to the frequency of the stray voltages. The signal generator 12 has low output impedance to match the low input circuit impedance.

FIG. 2 illustrates another example of an inverter to which the invention has been applied. Like reference characters indicate corresponding parts in FIGS. 1 and 2. In FIG. 1, the output power is continuous in contradistinction to pulsed power. In FIG. 2 provision is made for producing pulsed power by including in series in the direct current power supply a switch 23 which is opened and closed to provide the desired pulse length and duty cycles. A suitable cam 31 is provided to control the switch operations in accordance with the configuration of the cam. The cam and switch are shown only conventionally and by way of example and illustration, as other suitable means such as vacuum relay means for accomplishing the control of the pulse length and duty cycles may be employed. While the pulser or modulator means has been illustrated as incorporated in the direct current power supply circuit, it can instead be included in the signal generator circuit or the load circuit, for example. Also, there is included a grid resistance 25 shunted by a capacitor 26 in each connection between the signal generator and the thyratron control element. Also in the common connection between the signal generator and the cathodes of the thyratrons there is included a source of direct current bias 27 well bypassed for the alternating current by a shunt capacitor 28. Since the low impedance shunt is not necessary if the inverter is operated below power and frequency at which instability and misfiring occurs selectively open or closed switches 29 are connected in series with the two impedances 24 respectively for selectively disconnecting impedances 24. The signal generator output impedance is raised to match the inverter input impedance.

Though the illustrated inverters include gaseous thyratrons this invention can also be applied where the thyratrons used in the inverter are of the solid state type.

This invention has been successfully operated to produce pulsed alternating current power well above 100 kilowatts and at frequencies well above 10 kilocycles.

In FIG. 3 there is shown an improved novel thyratron 30 for the purposes described wherein the low impedance 24' is incorporated as part of thyratron unit within the envelope; this improved thyratron is for use in any type of thyratron inverter wherever the advantages of this invention are desired.

Obviously many modifications and variations of the present invention are possible in the light of the above teachings. It is therefore to be understood that within the scope of the appended claims the invention may be practiced otherwise than as specifically described.

We claim:

1. An improved gaseous thyratron for use in a thyratron inverter comprising an anode, a control grid and a cathode and a resistance of more than one and less than twenty ohms electrically connected directly between control grid and cathode within the thyratron envelope, and operable to resist instability when used in an inverter by shunting and attenuating stray signals generated incident to inverter operation tending to appear between control grid and cathode.

2. In an inverter of the type having two gaseous thyratrons for passing current alternately when in operation and in which each has an anode, a gate element, and a cathode and in which the maximum power that the inverter can deliver is substantially less than the apparent maximum power capacity of the inverter elements because the inverter power delivering capability is limited by thyratron misfiring, the improvement which comprises two resistances whose magnitudes are less than twenty ohms connected directly between the gate and cathode elements of the respective thyratrons and in close proximity thereto and operable to attenuate stray signals that may appear between the gate and cathode elements of the thyratrons incident to inverter power output.

References Cited in the file of this patent

UNITED STATES PATENTS

| | | |
|---|---|---|
| 1,937,369 | Willis | Nov. 28, 1933 |
| 2,100,702 | Schlesinger | Nov. 30, 1937 |
| 2,921,234 | Henquet | Jan. 12, 1960 |